United States Patent
Wagner et al.

(10) Patent No.: US 6,860,527 B2
(45) Date of Patent: Mar. 1, 2005

(54) STRAP CLAMP

(75) Inventors: Wayne M. Wagner, Apple Valley, MN (US); John I. Belisle, Hampton, MN (US); James P. Shields, Fairbank, IA (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/013,107

(22) Filed: Dec. 7, 2001

(65) Prior Publication Data

US 2003/0107220 A1 Jun. 12, 2003

(51) Int. Cl.[7] ............................................. F16L 25/00
(52) U.S. Cl. ........................ 285/420; 24/279; 24/276
(58) Field of Search ................................. 285/420, 417, 285/419, 367, 368, 373, 913; 24/276, 279

(56) References Cited

U.S. PATENT DOCUMENTS

| | | | | |
|---|---|---|---|---|
| 1,745,295 A | * | 1/1930 | Greve | 285/253 |
| 2,227,551 A | * | 1/1941 | Morris | 285/373 |
| 2,495,622 A | * | 1/1950 | Arbogast | 285/289.1 |
| 2,512,741 A | * | 6/1950 | Goodall | 248/309.4 |
| 2,690,193 A | * | 9/1954 | Smith | 138/99 |
| 2,983,982 A | * | 5/1961 | Solum et al. | 24/279 |
| 3,004,781 A | * | 10/1961 | Morris | 285/369 |
| 3,178,208 A | * | 4/1965 | Koehler | 285/322 |
| 4,049,298 A | * | 9/1977 | Foti | 285/148.26 |
| 4,056,273 A | * | 11/1977 | Cassel | 285/337 |
| 4,083,588 A | * | 4/1978 | Berger | 285/373 |
| 4,155,574 A | * | 5/1979 | Hulsey | 285/236 |
| 4,312,526 A | | 1/1982 | Cassel | |
| 4,473,246 A | * | 9/1984 | McDowell | 285/373 |
| 4,558,891 A | | 12/1985 | Wagner et al. | |
| 4,750,242 A | * | 6/1988 | Calmettes et al. | 24/20 R |
| 4,790,574 A | | 12/1988 | Wagner et al. | |
| 4,813,718 A | * | 3/1989 | Matter et al. | 285/373 |
| 4,813,720 A | | 3/1989 | Cassel | |
| 5,116,083 A | | 5/1992 | Gillingham et al. | |
| 6,116,659 A | | 9/2000 | Wagner | |
| 6,305,054 B1 | | 10/2001 | Imes et al. | |

FOREIGN PATENT DOCUMENTS

| | | | | |
|---|---|---|---|---|
| GB | 2 103 698 A | * | 2/1983 | 285/420 |
| WO | WO 80/02317 | * | 10/1980 | 285/419 |

* cited by examiner

*Primary Examiner*—James M. Hewitt
(74) *Attorney, Agent, or Firm*—Merchant & Gould P.C.

(57) ABSTRACT

A pipe clamp including a strap adapted to surround a pipe. The strap includes first and second opposing ends separated by a gap. The clamp also includes a fastener that extends across the gap for tightening or loosening the clamp by narrowing or widening the gap between the first and second opposing ends of the strap. The first opposing end includes at least one projection and the second opposing end defines at least one recess for receiving the projection when the clamp is tightened.

36 Claims, 7 Drawing Sheets

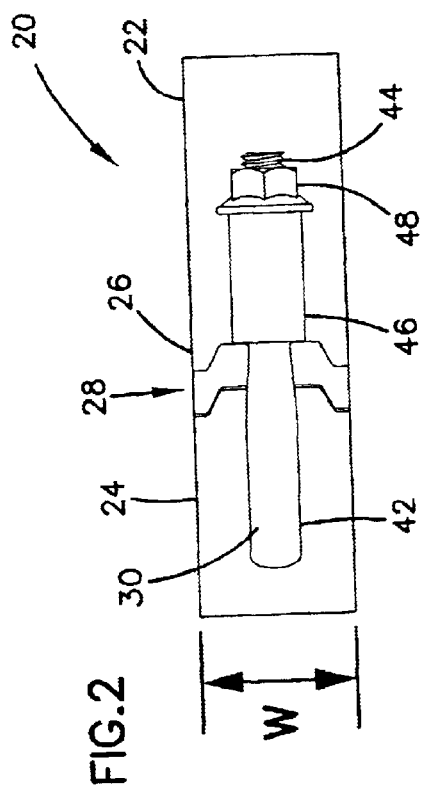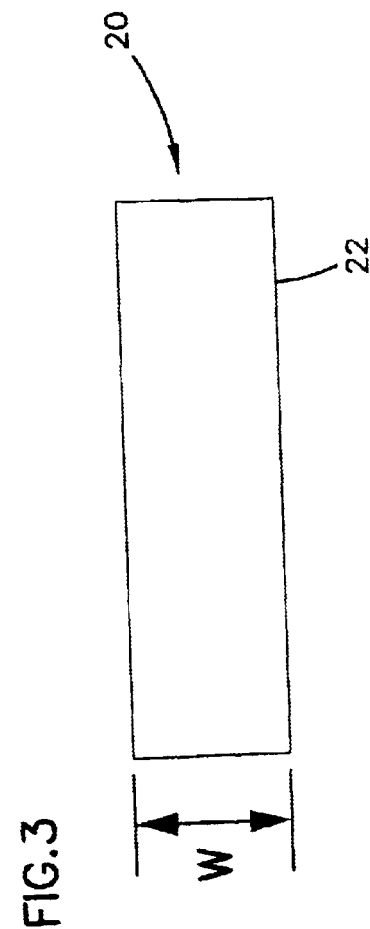
FIG.2
FIG.3

STRAP CLAMP

FIELD OF THE INVENTION

The present invention relates generally to clamps. More particularly, the present invention relates to clamps for clamping pipes such as vehicle exhaust system pipes.

BACKGROUND

There are many applications where it is desirable to connect two pipes together. One common application is vehicle exhaust systems. In vehicle exhaust systems, two pipes are often connected at a "lap joint." A "lap joint" is formed by inserting the end of one pipe into the end of another pipe such that the ends overlap one another. A clamp is then placed around the overlapped ends of the pipes. The clamp preferably functions to seal the lap joint and to mechanically connect the two pipes together such that the two pipes are prevented from being pulled apart. Clamps are also used on other types of vehicle exhaust components such as mufflers, catalytic converters, particulate filters, nitric oxide traps, etc.

Numerous patents exist relating to clamps used for vehicle exhaust systems. Some example patents related to this field include U.S. Pat. No. 4,312,526 to Cassel, U.S. Pat. No. 4,813,720 to Cassel, U.S. Pat. No. 6,116,659 to Wagner, U.S. Pat. No. 4,790,574 to Wagner et al. and U.S. Pat. No. 5,116,083 to Gillingham et al. The clamps disclosed in the above-identified patents are each made of a relatively thin, wide strap of ductile metal and are often referred to as "wide-band clamps." Other example patents relating to this field include U.S. Pat. No. 6,305,054 to Imes et al., and U.S. Pat. No. 4,558,891 to Wagner et al., both of which are hereby incorporated by reference in their entireties. The '054 patent and the '891 patent disclose clamps of the type often referred to as "narrow-band clamps." Narrow-band clamps are typically more narrow and substantially thicker than their wide-band counterparts.

Narrow-band clamps typically include a cylindrical strap having opposed ends separated by a gap. A fastener such as a bolt extends across the gap. To tighten the clamp about a pipe, a nut is threaded on the bolt causing the opposing ends of the strap to be drawn together thereby closing the gap. As the opposing ends of the strap are drawn together, it is sometimes possible for a portion of the pipe being clamped to pucker and become pinched into the gap. If the clamp is being used to seal a lap joint, this puckering and pinching action provides a possible area of leakage. A number of pipe clamps currently on the market from a number of different manufacturers have this problem.

SUMMARY

The present invention relates to a pipe clamp having structure for preventing a pipe from being pinched as the pipe is clamped.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 2 is a top view of the clamp of FIG. 1;

FIG. 3 is a bottom view of the clamp of FIG. 1;

Figure 1:
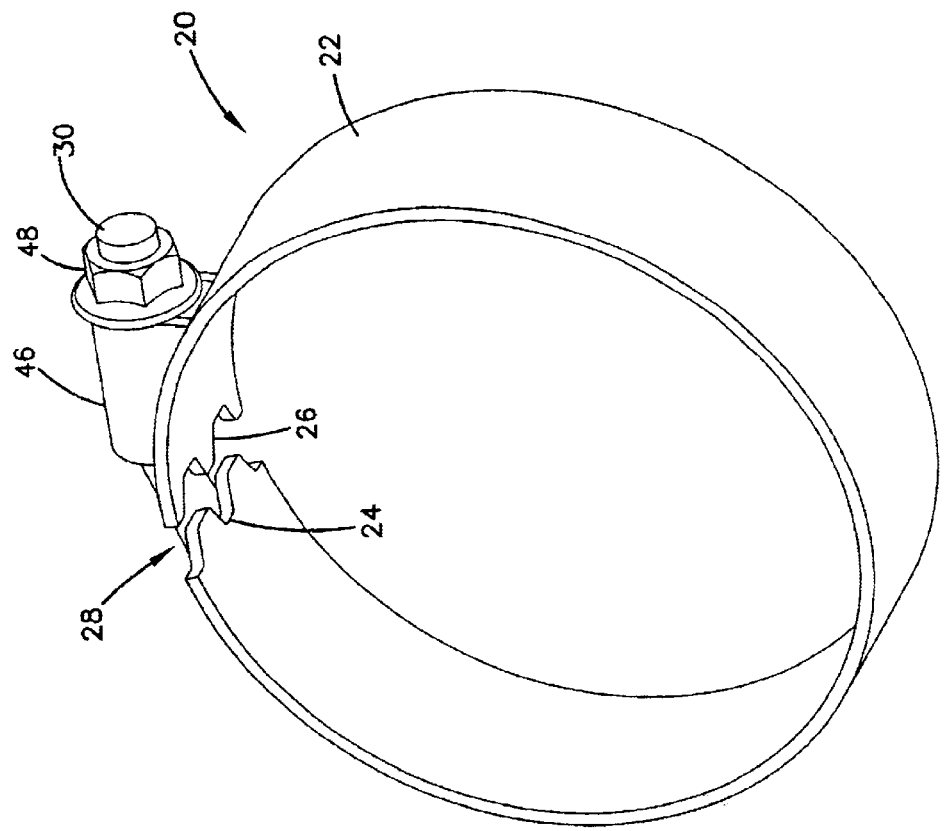
FIG. 1 is a perspective view of a clamp that is an embodiment of the present invention.

While the invention is amenable to various modifications and alternative forms, the specifics thereof have been shown by way of example in the drawings and will be described in detail below. It is to be understood, however, that the intention is not to limit the invention to the particular embodiments described. On the contrary, the intention is to cover all modifications, equivalents and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention. Further, each of the features disclosed herein can be considered standalone inventive features or features that have inventive aspects when considered in combination with one another.

FIGS. 1–7 illustrate a clamp 20 that is an embodiment of the present invention. The clamp 20 includes a strap 22 (i.e., a band or strip) adapted to surround a pipe. The strap 22 includes first and second opposing ends 24 and 26 (best shown in FIGS. 1 and 2) separated by a gap 28. A fastener 30 extends across the gap 28. The fastener 30 functions to tighten or loosen the clamp 20 by narrowing or widening the gap 28 between the first and second opposing ends 24 and 26. The first and second opposing ends 24 and 26 are preferably configured to prevent a pipe from pinching or puckering into the gap 28 during the clamping process. By preventing the pipe from pinching into the gap 28, leaks are prevented and an improved seal is provided about the pipe (e.g., at a lap joint).

Figure 1A:
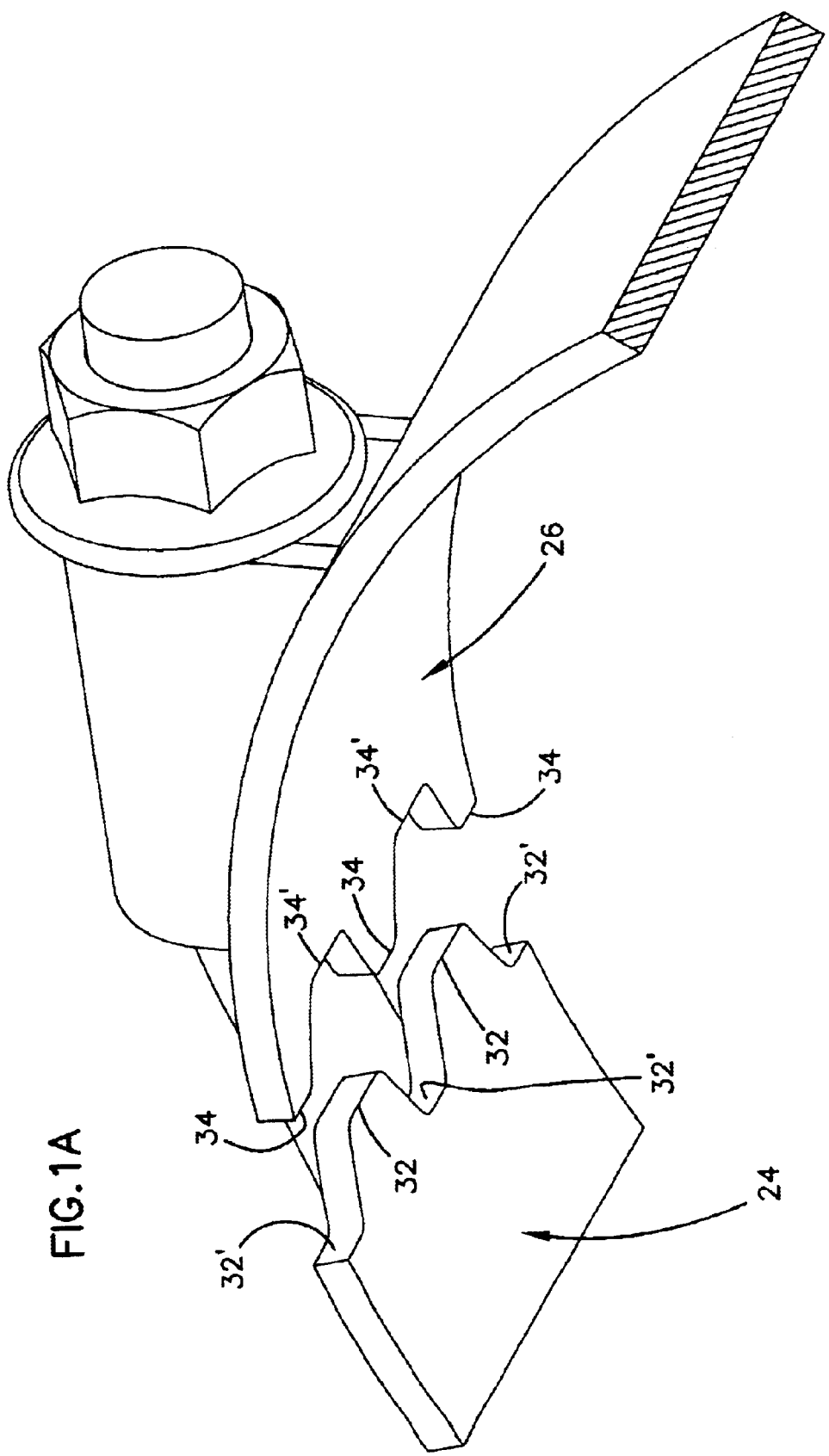
FIG. 1A is an enlarged detailed view of a portion of FIG. 1.
Figure 5:
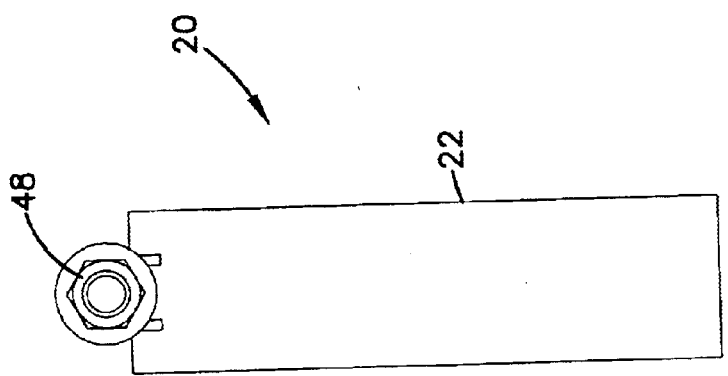
FIG. 5 is a right side view of the clamp of FIG. 1.

Referring to FIGS. 1, 1A and 2, the structure for preventing a pipe from being pinched in the gap 28 includes circumferential projections configured to intermesh when the clamp 20 is tightened. The first opposing end 24 includes two projections 32 and three recesses 32'. The opposing end 26 includes three projections 34 and two recesses 34'. When the clamp 20 is tightened, the projections 32 of the first opposing end 24 are received in the recesses 34' of the second opposing end 26, and the projections 34 of the second opposing end 26 are received in the recesses 32' of the first opposing end 24. When the projections 32 and 34 are received within their respective recesses 32' and 34', the projections 32 and 34 extend circumferentially past one another. It is noted that when the projections 32 and 34 are received into the recesses 32' and 34', the projections 32 and 34 do not ride over one another so as to form a double wall thickness. Instead, the projections 32 and 34 remain within a cylindrical boundary defined by the wall thickness of the strap 22.

It will be appreciated that the projections 32 have shapes that complement the recesses 34' into which they are received, and the projections 34 have shapes that complement the shapes of the recesses 32' into which they are received. As depicted in the drawings, at least some of the projections 32 and 34 have truncated triangular shapes. It will be appreciated that other shapes could also be used.

The strap 22 is preferably made of a material such as stainless steel or aluminized steel. In one non-limiting embodiment, the strap 22 has a width W (see FIGS. 2 and 3) less than two inches, and a wall thickness T (see FIGS. 4 and 6) in the range of 0.065 to 0.105 inches. Further, straps can be made at different diameters depending of the size of pipe desired to be clamped. In one embodiment, the strap has a diameter D (see FIGS. 4 and 6) in the range of 1¾–7 inches.

Figure 4:
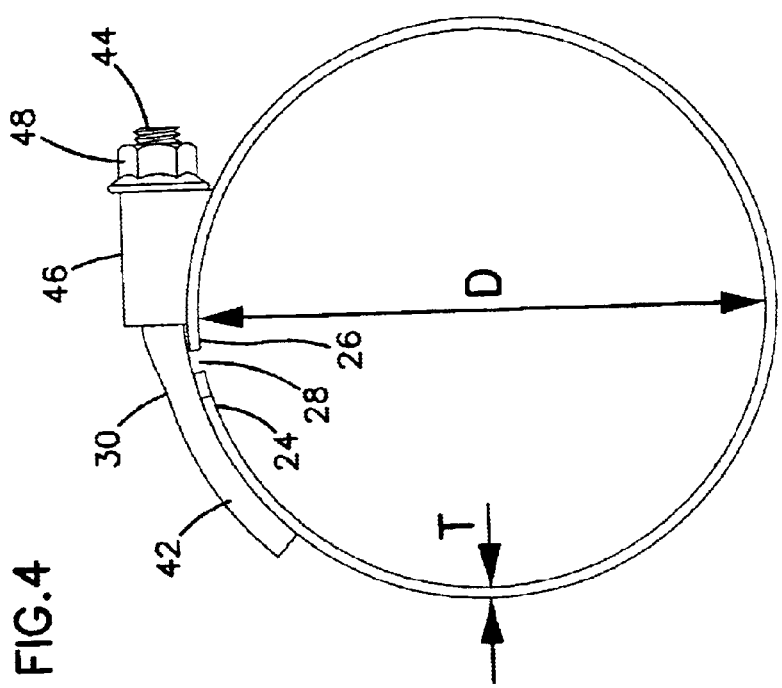
FIG. 4 is a front view of the clamp of FIG. 1.
Figure 7:
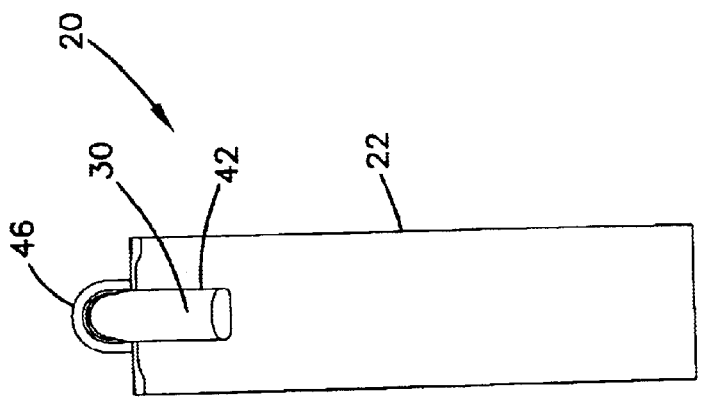
FIG. 7 is a right side view of the clamp of FIG. 1.
Figure 6:
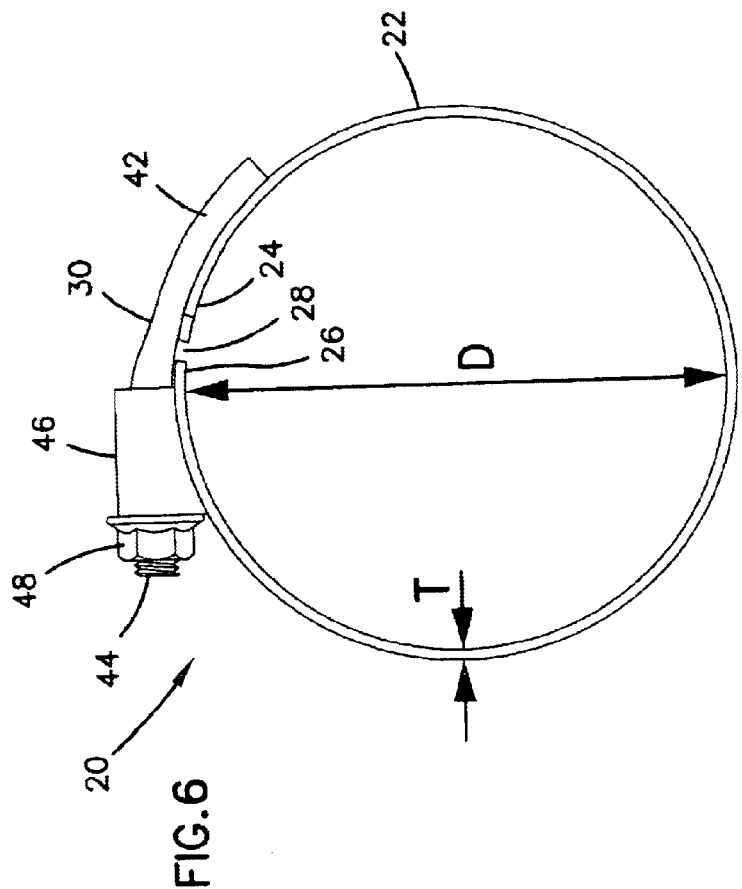
FIG. 6 is a rear view of the clamp of FIG. 1.

Referring to FIGS. 4 and 6, the fastener 30 of the clamp 20 includes a bolt 40 having a base end 42 and a threaded end 44. The base end 42 is connected (e.g., welded or secured by another fastening technique) to the first opposing end 24 of the clamp 20. The threaded end 44 extends across the gap 28 and through a sleeve 46 (i.e., a tunnel) connected to (e.g., welded or fastened by other techniques) to the second opposing end 26. A nut 48 is threaded on the threaded end 44 of the bolt 40. By tightening the nut 48, contact against the sleeve 46 causes the opposing ends 24 and 26 to be drawn together such that the gap 29 closes. When the nut 48 is loosened, the gap 28 widens such that the clamp 20 is loosened. The fastener preferably has the same configuration as the fastener disclosed in U.S. Pat. No. 6,305,054 that was previously incorporated by reference. It will be appreciated that other fastener configurations could also be used to tighten and loosen the clamp.

The strap 22 is preferably manufactured by punching the desired shape from a length of strap material. The strap 22 is then preferably rolled into a generally cylindrical configuration corresponding to that of a pipe through the use of a conventional roller forming process. With prior art clamps, it has at times proven difficult to form the opposing ends of such clamps with a curvature that precisely matches the curvature of the remainder of the strap. However, it has been determined by the inventors of the present invention that due to the reduction in material caused by providing recesses 32' and 34' at the opposing ends 24 and 26 of the strap 22, the ends (i.e., the projections 32 and 34) can be more easily formed to a curvature that matches the curvature of the remainder of the strap 22.

After the strap 22 has been formed into the cylindrical shape as described above, the bolt 40 can be connected to the first opposing end 24 of the strap 22. Thereafter, the sleeve 46 can be placed over the free end of the bolt 40 and connected to the second opposing end 26 of the strap 22. Finally, the nut 48 can be threaded on the threaded end 44 of the bolt 40.

Figure 8:
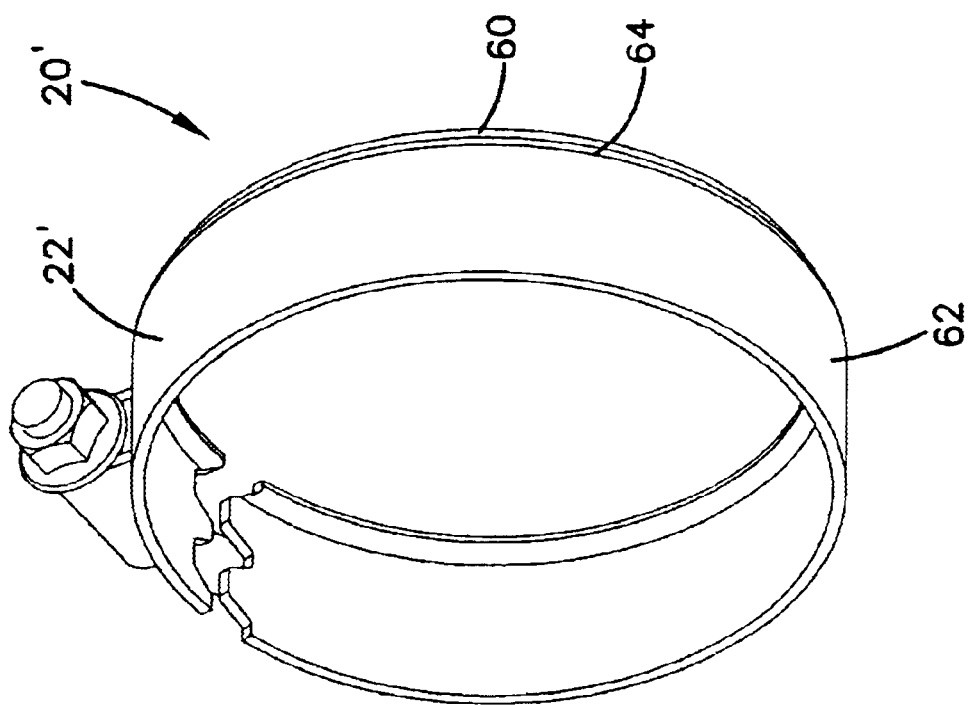
FIG. 8 is a perspective view of a clamp that is another embodiment of the present invention.
Figure 10:
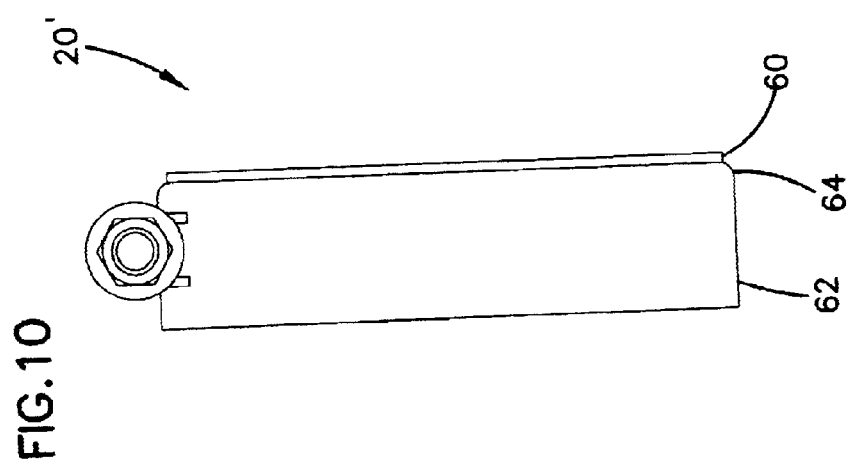
FIG. 10 is a right-side view of the clamp of FIG. 8.
Figure 9:
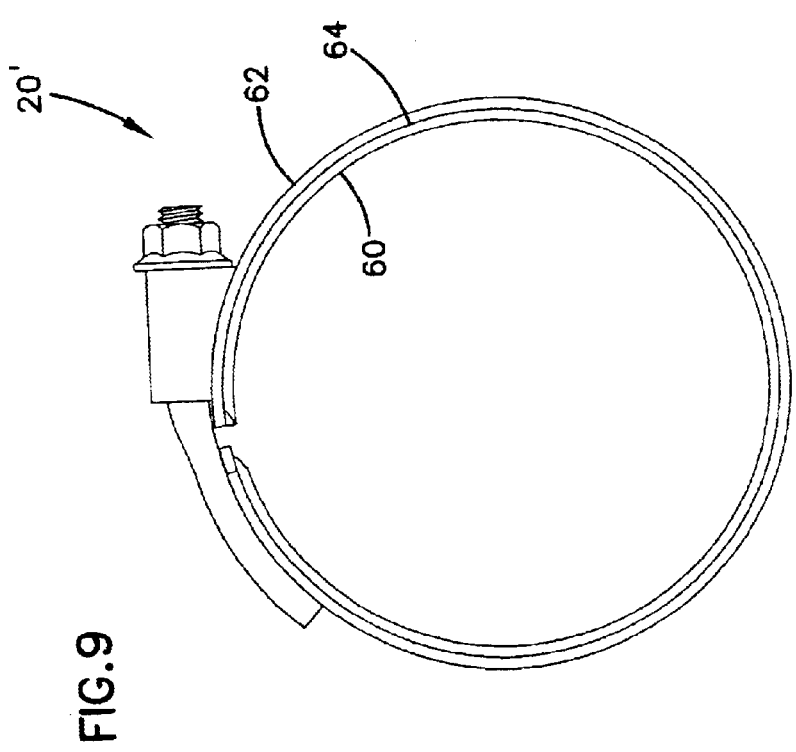
FIG. 9 is a rear view of the clamp of FIG. 8.

FIGS. 8–10 show a clamp 20' that is another embodiment of the present invention. The clamp 20' includes a sleeve 22' having a reduced diameter portion 60 and an enlarged diameter portion 62. A radial step 64 provides a diameter change between the reduced diameter portion 60 and the enlarged diameter portion 62. A similar step is shown in U.S. Pat. No. 6,305,054 that was previously incorporated by reference. It will be appreciated that with the exception of the step 64, the clamp 20' has the same configuration as the clamp 20 of FIGS. 1–7.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A pipe clamp comprising:
   a strap adapted to surround a pipe, the strap including first and second opposing ends separate by a gap;
   a threaded fastener that extends across the gap for tightening or loosening the clamp by narrowing or widening the gap between the first and second opposing ends of the strap;
   the first opposing end including at least one projection; and
   the second opposing end defining at least one recess for receiving the projection when the clamp is tightened.

2. The pipe clamp of claim 1, wherein the first opposing end includes two projections, and the second opposing end includes two recesses.

3. The pipe clamp of claim 2, wherein the projections include truncated triangular shapes.

4. The pipe clamp of claim 1, wherein the strap includes an increased diameter portion and a reduced diameter portion, the reduced diameter portion and the increased diameter portion being separated by a step.

5. The pipe clamp of claim 1, wherein the fastener includes a bolt having a base end and a threaded end, wherein the clamp includes a sleeve connected to the second opposing end of the strap, wherein the base end of the bolt is connected to the first opposing end of the strap, and wherein the threaded end of the bolt extends through the sleeve.

6. The pipe clamp of claim 5, wherein the first opposing end includes two projections, and the second opposing end includes two recesses.

7. The pipe clamp of claim 6, wherein the projections include truncated triangular shapes.

8. The pipe clamp of claim 1, wherein at least one projection has a truncated triangular shape.

9. The pipe clamp of claim 1, wherein the strap includes metal.

10. The pipe clamp of claim 9, wherein the metal is stainless steel or aluminized steel.

11. The pipe clamp of claim 1, wherein the strap has a width less than 2 inches.

12. The pipe clamp of claim 1, wherein the strap has a wall thickness in the range of 0.065 to 0.105 inches.

13. The pipe clamp of claim 1, further comprising a bolt attached to one of the first and second opposing ends of the strap, and a sleeve attached to the other of the first and second opposing ends, the sleeve being configured to receive the bolt.

14. The pipe clamp of claim 1, wherein the fastener includes a bolt that extends across the gap.

15. A pipe clamp comprising:
   a strap adapted to surround a pipe, the strap including first and second opposing ends separated by a gap;
   a threaded fastener that extends across the gap for tightening or loosening the clamp by narrowing or widening the gap between the first and second opposing ends of the strap;

the first opposing end including a first portion;

the second opposing end including a second portion; and the first and second portions being configured to extend circumferentially past one another when the clamp is tightened while remaining substantially within a cylindrical boundary defined by a wall thickness of the strap.

16. The pipe clamp of claim 15, wherein the fastener includes a bolt having a base end and a threaded end, wherein the clamp includes a sleeve connected to the second opposing end of the strap, wherein the base end of the bolt is connected to the first opposing end of the strap, and wherein the threaded end of the bolt extends through the sleeve.

17. The pipe clamp of claim 15, wherein the strap includes metal.

18. The pipe clamp of claim 17, wherein the metal is stainless steel or aluminized steel.

19. The pipe clamp of claim 15, wherein the strap has a width less than 2 inches.

20. The pipe clamp of claim 15, wherein the wall thickness of the strap is in the range of 0.065 to 0.105 inches.

21. The pipe clamp of claim 15, wherein the fastener includes a bolt that extends across the gap.

22. A pipe clamp comprising:

a metal strap including first and second opposing ends separated by a gap;

a bolt that extends across the gap for tightening or loosening the clamp by narrowing or widening the gap between the first and second opposing ends of the strap, the bolt having a base end connected to the first opposing end;

a sleeve connected to the second opposing end for receiving a free end of the bolt; and the first and second ends of the strap being configured to intermesh when the clamp is tightened.

23. The pipe clamp of claim 22, wherein the first and second opposing ends include circumferential teeth having truncated triangular shapes.

24. The pipe clamp of claim 23, wherein the strap has a width less than 2 inches.

25. The pipe clamp of claim 24, wherein the strap has a wall thickness in the range of 0.065 to 0.105 inches.

26. The pipe clamp of claim 25, wherein the strap includes stainless steel or aluminized steel.

27. The pipe clamp of claim 22, wherein the bolt is curved.

28. The pipe clamp of claim 22, wherein:

a) one of the first and second ends of the strap includes first, second and third projections, the second projection being positioned beneath the bolt and the first and third projections being positioned on opposite sides of the bolt; and b) the other of the first and second ends including first, second and third recesses for respectively receiving the first, second and third projections when the clamp is tightened.

29. The pipe clamp of claim 28, wherein the strap has a thickness in the range of 0.065 to 0.105 inches.

30. The pipe clamp of claim 28, wherein the first, second and third projections are located at the first end of the strap, and the first, second and third recesses are located at the second end of the strap.

31. The pipe clamp of claim 28, wherein the bolt is curved.

32. A pipe clamp comprising:

a metal strap including first and second opposing ends separated by a gap;

only a single bolt that extends across the gap for tightening or loosening the clamp by narrowing or widening the gap between the first and second opposing ends of the strap, the bolt having a base end connected to the first opposing end;

a sleeve connected to the second opposing end for receiving a free end of the bolt;

the first and second ends of the strap being configured to intermesh when the clamp is tightened;

one of the first and second ends including no more than three projections; and the other of the first and second ends including no more than three recesses for receiving the projections.

33. The pipe clamp of claim 32, wherein:

a) one of the first and second ends of the strap includes first, second and third projections, the second projection being positioned beneath the bolt and the first and third projections being positioned on opposite sides of the bolt; and b) the other of the first and second ends including first, second and third recesses for respectively receiving the first, second and third projections when the clamp is tightened.

34. The pipe clamp of claim 32, wherein the strap has a thickness in the range of 0.065 to 0.105 inches.

35. The pipe clamp of claim 33, wherein the first, second and third projections are located at the first end of the strap, and the first, second and third recesses are located at the second end of the strap.

36. The pipe clamp of claim 32, wherein the strap has a width less than 2 inches.

* * * * *

UNITED STATES PATENT AND TRADEMARK OFFICE
CERTIFICATE OF CORRECTION

PATENT NO. : 6,860,527 B2 Page 1 of 1
APPLICATION NO. : 10/013107
DATED : March 1, 2005
INVENTOR(S) : Wagner et al.

It is certified that error appears in the above-identified patent and that said Letters Patent is hereby corrected as shown below:

Col. 4, line 14, claim 1: "opposing ends separate by a gap;" should read --opposing ends separated by a gap;--

Signed and Sealed this

Fifteenth Day of August, 2006

JON W. DUDAS
*Director of the United States Patent and Trademark Office*